United States Patent
Dolan et al.

(10) Patent No.: US 10,650,687 B2
(45) Date of Patent: May 12, 2020

(54) DECODING POSITION INFORMATION IN SPACE-BASED SYSTEMS

(71) Applicant: Aireon LLC, McLean, VA (US)

(72) Inventors: John Dolan, Chantilly, VA (US); Andrew Hoag, Vienna, VA (US); Michael A. Garcia, Ashburn, VA (US)

(73) Assignee: Aireon LLC, McLean, VA (US)

( * ) Notice: Subject to any disclaimer, the term of this patent is extended or adjusted under 35 U.S.C. 154(b) by 180 days.

(21) Appl. No.: 15/983,220

(22) Filed: May 18, 2018

(65) Prior Publication Data

US 2019/0355264 A1 Nov. 21, 2019

(51) Int. Cl.
*G08G 5/00* (2006.01)
*G01S 11/02* (2010.01)

(52) U.S. Cl.
CPC .......... *G08G 5/0082* (2013.01); *G01S 11/026* (2013.01)

(58) Field of Classification Search
CPC ............................ G08G 5/0082; G01S 11/026
See application file for complete search history.

(56) References Cited

U.S. PATENT DOCUMENTS

| | | | | |
|---|---|---|---|---|
| 6,040,798 A * | 3/2000 | Kinal | ....................... | G01S 19/41 342/357.21 |
| 6,182,927 B1 * | 2/2001 | Galvin | .................. | B64G 1/1014 244/158.4 |
| 7,362,262 B2 * | 4/2008 | Murphy | .................. | G01S 19/00 342/357.21 |
| 9,221,553 B1 * | 12/2015 | Mitchell | ................ | B64D 45/00 |
| 9,647,748 B1 * | 5/2017 | Mitchell | ............ | H04B 7/18508 |
| 9,743,264 B2 * | 8/2017 | Petkus | .................... | H04W 4/90 |
| 9,819,410 B1 * | 11/2017 | Azevedo | ............ | H04B 7/18515 |
| 2007/0252760 A1 * | 11/2007 | Smith | .................... | G01S 5/0027 342/451 |
| 2013/0147652 A1 * | 6/2013 | Haque | .................. | G08G 5/0008 342/21 |
| 2014/0002293 A1 * | 1/2014 | Behrens | ............... | G08G 5/0013 342/36 |

(Continued)

OTHER PUBLICATIONS

European Patent Office, Extended Search Report for Application No. 19175148.6, dated Oct. 25, 2019.

(Continued)

*Primary Examiner* — Calvin Cheung
(74) *Attorney, Agent, or Firm* — Baker Botts L.L.P.

(57) ABSTRACT

In one implementation, a pair of messages are received from one or more space-based receivers that each received the pair of messages. The pair of messages comprise encoded position information of a transmitter, and a plurality of candidate locations for the transmitter is determined therefrom. A location of the transmitter is determined by eliminating candidate locations until only one remains. In particular, each candidate location that is not within a coverage area of each of the space-based receivers is eliminated, and each candidate location that is not within a predetermined distance of at least one previous candidate location is eliminated. In addition, it is determined that the remaining candidate location is within the coverage area of each of the space-based receivers as well as within the predetermined distance of at least one previous candidate location. Upon determining the location of the transmitter, it is transmitted to a subscriber system.

20 Claims, 9 Drawing Sheets

(56) References Cited

U.S. PATENT DOCUMENTS

| | | | | |
|---|---|---|---|---|
| 2014/0099884 A1* | 4/2014 | Lozano | ............... | H04M 15/81 |
| | | | | 455/12.1 |
| 2014/0266872 A1* | 9/2014 | Mitola, III | ............ | H04B 7/195 |
| | | | | 342/356 |
| 2014/0354477 A1* | 12/2014 | Robinson | ............... | G01S 19/11 |
| | | | | 342/357.78 |
| 2015/0247730 A1* | 9/2015 | Calmettes | ............. | G01C 21/24 |
| | | | | 701/468 |
| 2016/0041267 A1* | 2/2016 | Robinson | ............. | G01S 11/026 |
| | | | | 342/357.51 |
| 2017/0212245 A1* | 7/2017 | Digrazia | ................ | G01S 19/30 |
| 2018/0159617 A1* | 6/2018 | Nobbe | .............. | H04B 7/18513 |

OTHER PUBLICATIONS

Jeff Beyer, "Locating Aircraft with Space-Based ADS-B," Integrated Communications, Navigation and Surveillance Conference, Apr. 22, 2013, pp. 1-15.

Aaron Dutle, et al., "A Formal Analysis of the Compact Position Reporting Algorithm," International Conference on Computer Analysis of Images and Patterns, Dec. 15, 2017, pp. 19-34.

K. Werner, et al., "ADS-B over Satellite: Global Air Traffic Surveillance from Space," Tyrrhenian International Workshop on Digital Communications, Sep. 15, 2014, pp. 47-52.

Icao, "2.6 Latitude/Longitude Coding Using Compact Position Reporting (CPR)", Annex 10—Aeronautical Telecommunications vol. III, Nov. 28, 2002, pp. 88-94.

\* cited by examiner

Space Based Global CPR Surface Decode - Latitude

1: $Dlat_0 = \frac{90°}{60}$
2: $Dlat_1 = \frac{90°}{59}$
3: $j = \text{floor}\left(\frac{59 \cdot YZ_0 - 60 \cdot YZ_1}{2^{17}} + \frac{1}{2}\right)$
4: $Rlat_0 = Dlat_0 \cdot \left(\text{mod}(j, 60) + \frac{YZ_0}{2^{17}}\right)$
5: $Rlat_1 = Dlat_1 \cdot \left(\text{mod}(j, 59) + \frac{YZ_1}{2^{17}}\right)$
6: $NL_0$ = Longitude Zones($Rlat_0$)
7: $NL_1$ = Longitude Zones($Rlat_1$)
8: if $NL_0 \mathrel{!=} NL_1$ then
9:     return Failure   ▷ Abandon decode of this even-odd pair
10: end if
11: if i==1 then   ▷ The most recent parity is "Odd"
12:     $Rlat_{North} = Rlat_1$
13:     $Rlat_{South} = Rlat_1 - 90°$
14: else
15:     $Rlat_{North} = Rlat_0$
16:     $Rlat_{South} = Rlat_0 - 90°$
17: end if
18: $D_{North} = |Rlat_{North} - \phi|$   ▷ Determine Northern or Southern Hemisphere
19: $D_{South} = |Rlat_{South} - \phi|$
20: if $D_{North} < D_{South}$ then
21:     $Rlat = Rlat_{North}$
22: else
23:     $Rlat = Rlat_{South}$
24: end if
25: return $Rlat$   ▷ The decoded latitude

FIG. 2

| Longitude Zones |
| --- |
| 1: if $lat = 0$ (the equator) then |
| 2:    $NL = 59$ |
| 3: else if $\|lat\| = 87$ then |
| 4:    $NL = 2$ |
| 5: else if $\|lat\| > 87$ then |
| 6:    $NL = 1$ |
| 7: else |
| 8:    $NL = \text{floor}\left(2\pi \cdot \left[\arccos\left(1 - \dfrac{1 - \cos\left(\dfrac{\pi}{2 \cdot NZ}\right)}{\cos^2\left(\dfrac{\pi}{180°} \cdot \|lat\|\right)}\right)\right]^{-1}\right)$ |
| 9: end if |
| 10: return $NL$ |

FIG. 3

Space Based Global CPR Surface Decode - Longitude

1: $NL$ = Longitude Zones($Rlat$)  ▷ See Fig. 3
2: $n = \max(NL - i, 1)$
3: $Dlon = \dfrac{90}{n}$
4: $m = \text{floor}\left(\dfrac{XZ_0 \cdot (NL-1) - XZ_1 \cdot NL}{2^{17}} + \dfrac{1}{2}\right)$
5: if i=1 then  ▷ The most recent party is "Odd"
6: $\quad Qlon = Dlon \cdot \left(\text{mod}(m,n) + \dfrac{XZ_1}{2^{17}}\right)$
7: else
8: $\quad Qlon = Dlon \cdot \left(\text{mod}(m,n) + \dfrac{XZ_0}{2^{17}}\right)$
9: end if
10: $Rlon = [Qlon, Qlon + 90°, Qlon + 180°, Qlon + 270°]$  ▷ Get the four possible choices for Longitude
11: for each satellite do
12: $\quad D_{max} = \arccos\left(\dfrac{R_\oplus}{R_\oplus + h_j}\right) \cdot R_\oplus \cdot \sigma_D$  ▷ $j$ is the receiver index in this loop
13: $\quad$ for each value in $Rlon$ do
14: $\quad\quad D$ = Great Circle Distance($Rlat, Rlon_k, \phi_j, \lambda_j$)  ▷ $k$ is the index in $Rlon$ list
15: $\quad\quad$ if $D > D_{max}$ then
16: $\quad\quad\quad$ Remove this value from the $Rlon$ choices
17: $\quad\quad$ end if
18: $\quad$ end for
19: end for
20: if no $Rlon$ choices left then
21: $\quad$ return Failure  ▷ Abandon decode of this even-odd pair

FIG. 4A

```
22: else if only one Rlon choice then
23:     return Rlon                                ▷ Only one choice within range. Select as the solution
24: else
25:     if any(Rlon_prev) then
26:         Rlon_match = select Rlon values within 1° of any Rlon_prev values
27:         if only one Rlon_match value then
28:             return Rlon_match
29:         else
30:             Rlon_prev = Rlon_match
31:             return Failure             ▷ Cannot decode but have more information for next attempt
32:         end if
33:     else
34:         Rlon_prev = Rlon
35:         return Failure                 ▷ Cannot decode but have more information for next attempt
36:     end if
37: end if
```

DECODING POSITION INFORMATION IN SPACE-BASED SYSTEMS

TECHNICAL FIELD

The disclosure relates generally to decoding position information, and, more specifically, to decoding surface position information in ADS-B transmissions received by a space-based system.

SUMMARY

According to one implementation of the disclosure, a pair of messages are received from one or more space-based receivers that each received the pair of messages. The pair of messages comprise encoded position information of a transmitter, and a plurality of candidate locations for the transmitter is determined therefrom. A location of the transmitter is determined by eliminating candidate locations until only one remains. In particular, each candidate location that is not within a coverage area of each of the space-based receivers is eliminated, and each candidate location that is not within a predetermined distance of at least one previous candidate location is eliminated. In addition, it is determined that the remaining candidate location is within the coverage area of each of the space-based receivers as well as within the predetermined distance of at least one previous candidate location. Upon determining the location of the transmitter, it is transmitted to a subscriber system.

According to another implementation of the disclosure, a pair of messages is received from a plurality of satellite-based receivers, each of which received the pair of messages. The pair of messages comprises encoded position information of a transmitter of the pair of messages, and the encoded position information is decoded therefrom. In particular, a pool of a plurality of candidate locations for the transmitter is determined based on the decoded position information. Thereafter, for each of the plurality of satellite-based receivers a determination is made as to whether each candidate location in the pool is within a coverage area for the satellite-based receiver. If any candidate location in the pool is not within the coverage area for the satellite-based receiver, that candidate location is removed from the pool.

According to still another implementation of the disclosure, a terrestrial processing center that tracks aircraft positioning using a multi-satellite, satellite constellation includes one or more processing elements, and a non-transitory, computer-readable storage medium storing computer-readable instructions. When executed by the one or more processing elements, the computer-readable instructions cause the terrestrial control center to process pairs of compact position reporting ("CPR") encoded, automatic dependent surveillance-broadcast ("ADS-B") surface position messages received from each of one or more space-based receivers, the pairs of messages comprising encoded surface position information of a transmitter of the pair of messages and having been received by each of the one or more space-based receivers. In addition, the computer-readable instructions cause the terrestrial control center to determine a latitude component of a location of the transmitter based on the encoded surface position information and to determine a pool of a plurality of candidate longitude values for the location of the transmitter based on the encoded surface position information. The computer-readable instructions also cause the terrestrial control center to select a longitude component of the location of the transmitter of the message from the pool. This selection includes eliminating each candidate longitude value from the pool that is not within a coverage area of each of the one or more space-based receivers, eliminating each candidate longitude value from the pool that is not within a predetermined distance of at least one previous candidate longitude location from a previous pool of candidate longitude values, determining that a remaining candidate longitude value is within the coverage area of each of the one or more space-based receivers, determining that the remaining candidate longitude value is within the predetermined distance of at least one previous candidate longitude location from the previous pool of candidate longitude values, and selecting the remaining candidate longitude value based on determining that the remaining candidate longitude value is within the coverage area of each of the one or more space-based receivers and within the predetermined distance of the at least one previous candidate longitude location. In addition, the computer-readable instructions cause the terrestrial control center to determine the location of the transmitter based on the determined latitude component and selected longitude component and to transmit the determined location of the transmitter to an external system.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

FIGS. 2, 3, and 4A and B are examples of methods for decoding position information in space-based systems in accordance with a non-limiting implementation of the present disclosure.

DETAILED DESCRIPTION

Automatic dependent surveillance-broadcast ("ADS-B")-based systems are being widely adopted for modern flight surveillance technology. In these systems, an aircraft-borne transponder broadcasts periodic messages including position and other information that is received and used for flight surveillance purposes, such as, for example, air traffic control. Different examples of ADS-B-based systems for aircraft surveillance, air traffic control, and flight management systems—including both terrestrial and space-based systems—are described below in connection with FIGS. 6A, 6B, and 7.

ADS-B transponders may transmit position information encoded according to the Compact Position Reporting ("CPR") scheme, and the position information may be encoded in one of two different formats. One format may be used when the aircraft is airborne, while a second format may be used when the aircraft is not airborne but instead is located on the Earth's surface. While time importance of accurate airborne position information for aircraft may be readily apparent (e.g., for air traffic control), accurate surface information for aircraft also may be important. For example, aircraft surface position information may be used by air traffic controllers to track and control airplanes on runways.

Both formats for CPR-encoded position information encode latitude and longitude values into compliant ADS-B position reports. CPR encoding is advantageous in that it may reduce the number of bits required to transmit a given position while maintaining a high position resolution. For example, without CPR encoding, 45 bits may be required to report a given position to within a 5.1 meter resolution (a potentially desirable resolution for airborne position reporting), while 35 bits may be sufficient to report the same position information to within the same resolution using CPR encoding. Thus, at least for airborne position reporting, CPR encoding may save as many as 10 bits for each position report. For surface position reporting, the desired resolution for a surface position may be even higher (e.g., 1.5 meter resolution). Nevertheless, CPR encoding may be able to save up to 14 bits per message while still achieving the desired resolution. Despite these advantages of CPR encoding, it is not without potential drawbacks as well. For example, using CPR encoding may introduce ambiguity into encoded position information, especially in the case of surface position reporting.

According to the CPR encoding scheme, the format used to report surface position messages assumes aprior knowledge of the particular quadrant of the Earth's surface in which the target is located. For ground-based ADS-B receivers, identifying the particular quadrant of the Earth's surface in which the target is located rarely if ever is problematic as it can be assumed to be within the same quadrant as the statically positioned ground-based receiver itself.

Figure 6A:
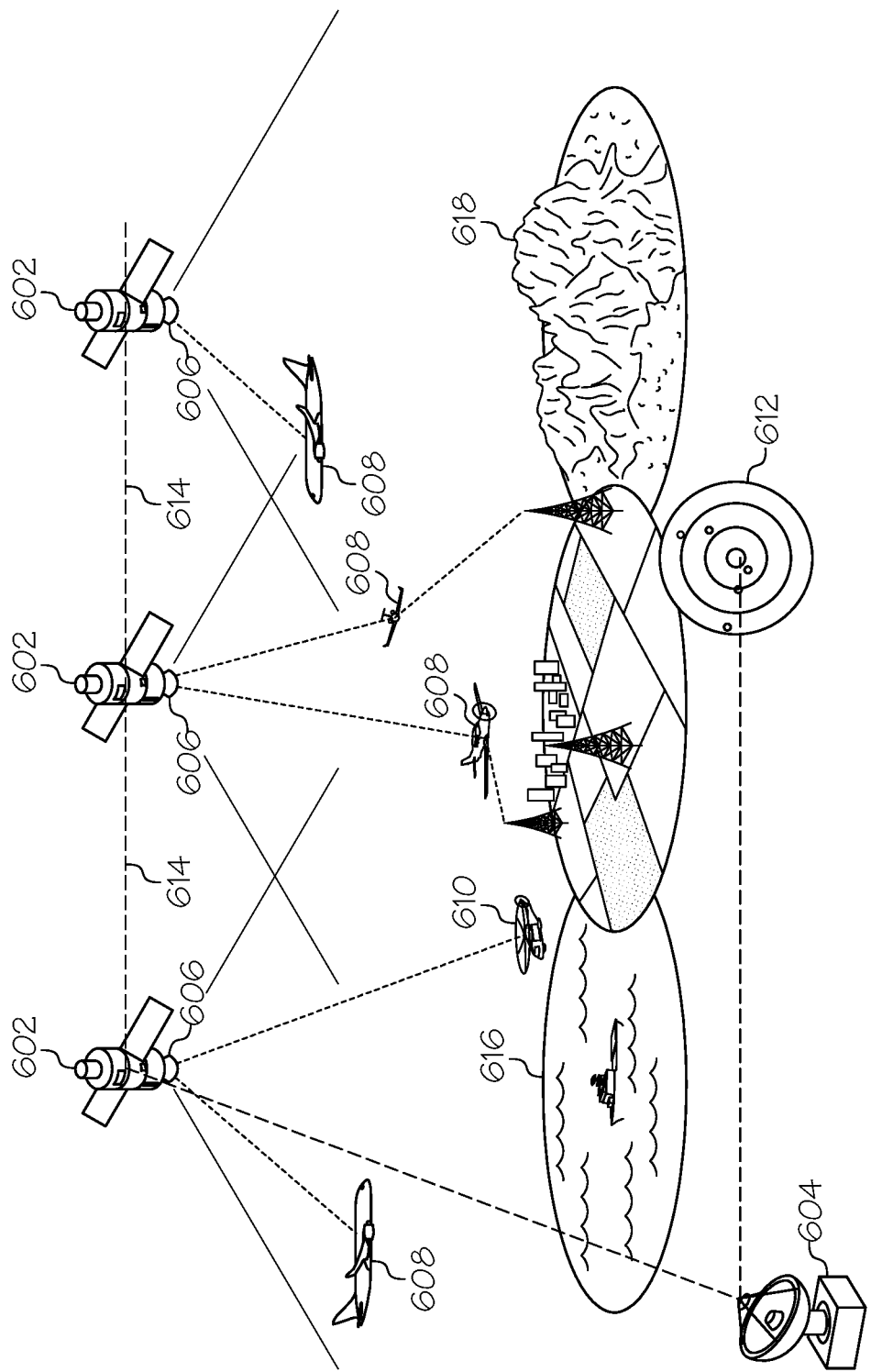
FIGS. 6A and 7 are high level block diagrams of examples of space-based ADS-B systems in accordance with non-limiting implementations of the present disclosure.
Figure 6B:
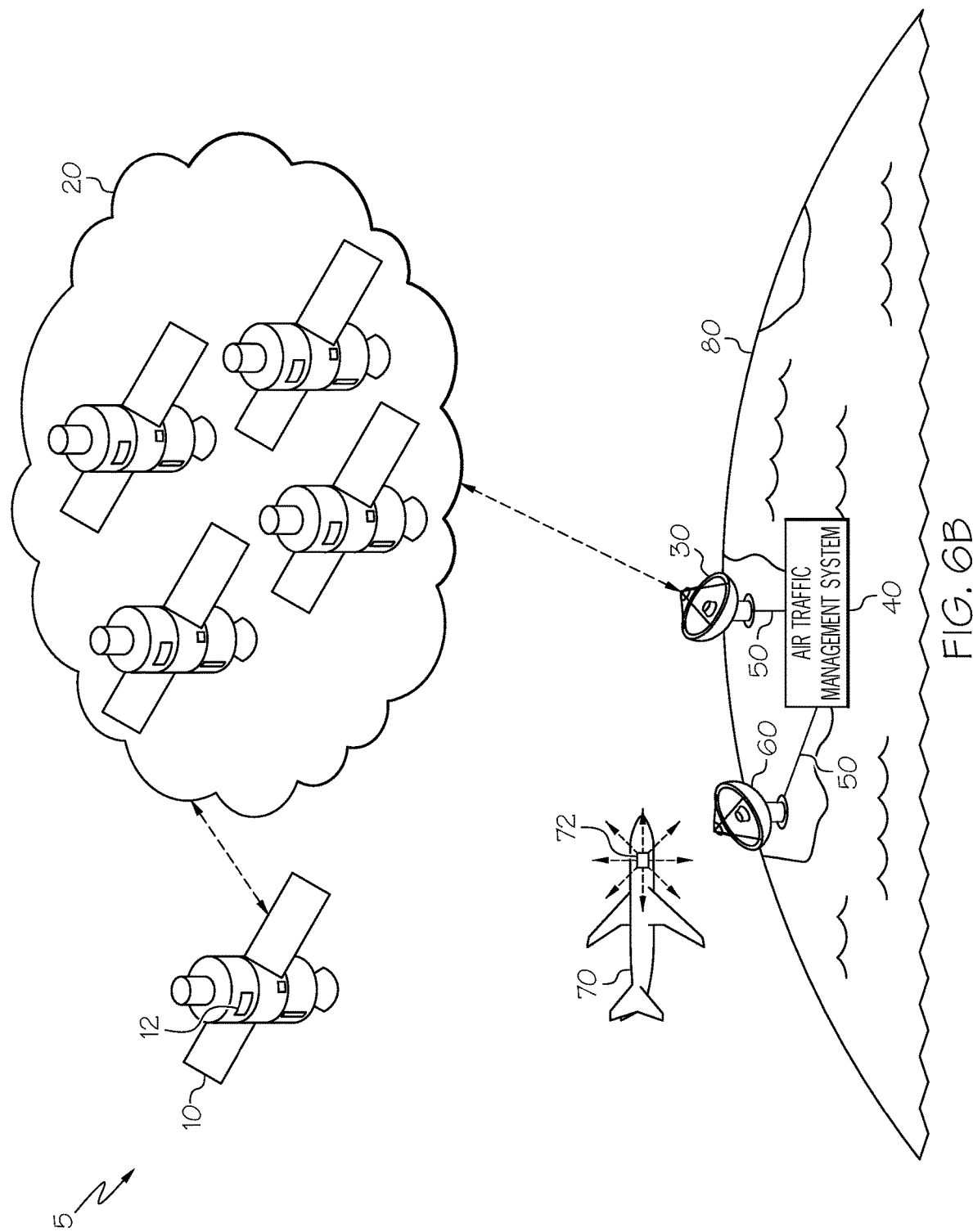
FIG. 6B is a high level block diagram of an example of an air traffic management system ecosystem in accordance with a non-limiting implementation of the present disclosure.
Figure 7:
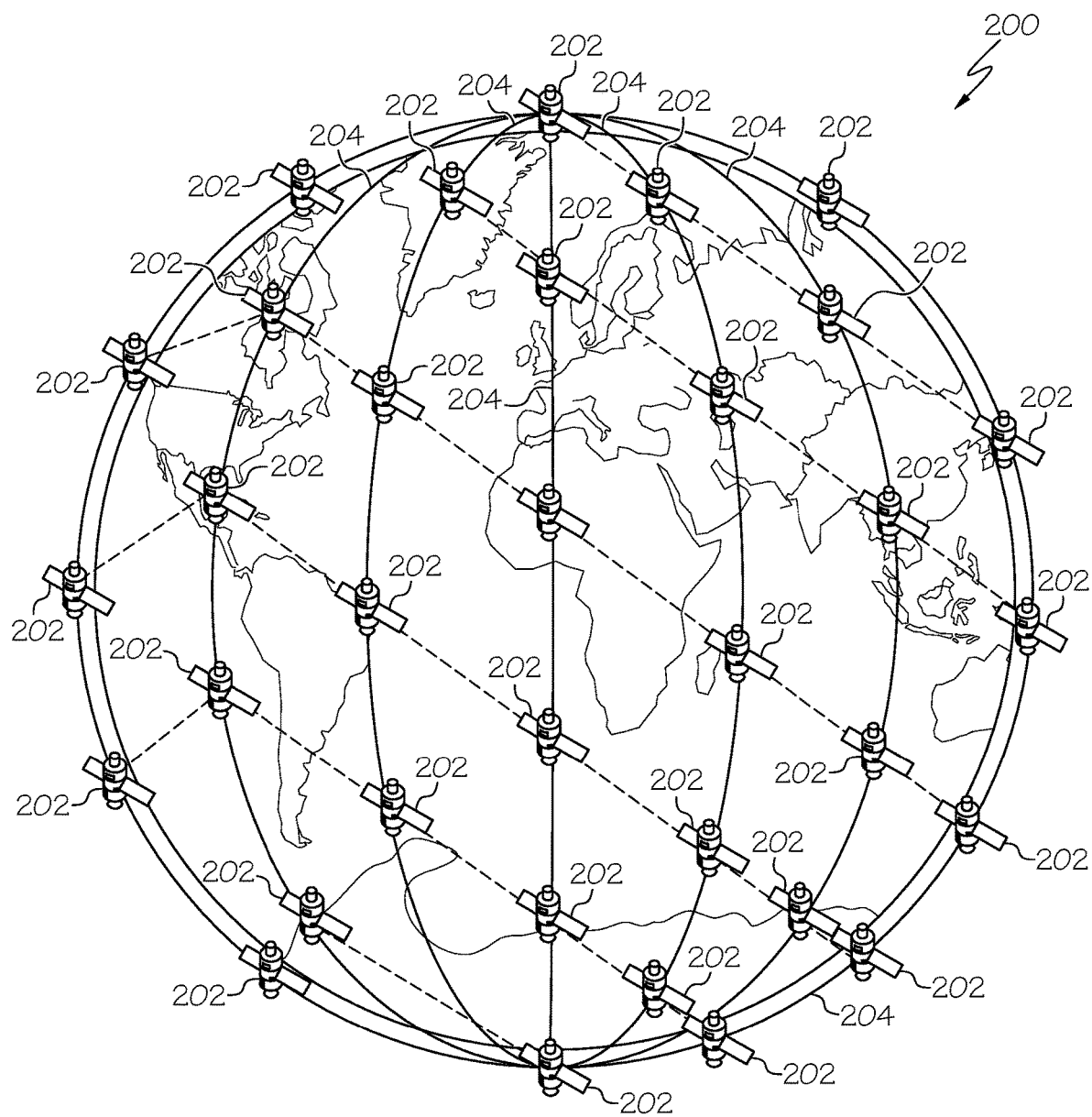

In contrast, when satellite-based ADS-B receivers in a space-based system, such as, for example, those described below in connection with FIGS. 6A, 6B, and 7, are used to receive ADS-B messages, CPR encoding may introduce ambiguity into surface position reports, because the coverage area of an individual satellite-based ADS-B receiver may include more than a single quadrant. For example, this may be particularly the case for higher latitudes in a satellite-based ADS-B system in which satellites are in polar orbits and the coverage footprints of their ADS-B receivers cover a wide range of degrees of longitude. When a satellite-based ADS-B receiver that has a coverage footprint that includes two or more different quadrants receives a CPR-encoded surface position report, in some cases, it may not be possible to determine which particular quadrant the surface position report was transmitted from without more information, and, thus, without more information, it may not be possible to unambiguously resolve the target's surface position without more information.

In some implementations of space-based ADS-B systems, multiple satellites in a satellite constellation are equipped with ADS-B receivers for receiving ADS-B messages broadcast by aircraft. In some particular implementations, each satellite in a low-Earth orbit ("LEO") (e.g., orbits having altitudes of ~99-1200 miles) constellation of satellites having 6 planes of 11 satellites in substantially polar orbits may be equipped with an ADS-B receiver such that, collectively, the ADS-B receivers on board the satellites provide global or substantially global ADS-B coverage. In such implementations, the satellites may be connected by inter-satellite crosslinks that effectively create a wireless mesh network in space through which individual satellites of the constellation can communicate with one another and/or with terrestrial infrastructure like Earth terminals and the like. As such, ADS-B messages received by the receivers on board the satellites may be communicated through the satellite network to terrestrial communications infrastructure for, for example, an aircraft surveillance system, such as one provided for air traffic control. In such (or other) implementations, the coverage areas of ADS-B receivers on individual satellites may overlap such that ADS-B receivers on two or more satellites may receive the same message transmitted by a single aircraft. Additionally, or alternatively, in such (or other) implementations, the coverage area of an ADS-B receiver on a satellite may cover all or parts of two or more quadrants of the Earth's surface. For example, in some implementations, an ADS-B receiver on board a LEO satellite may have a coverage area radius of 3,000 km or more. In such cases where an ADS-B receiver on board a LEO satellite has a coverage footprint that includes two or more different quadrants, when the ADS-B receiver receives a CPR-encoded surface position report, it may not be possible to determine which particular quadrant the surface position report was transmitted from without more information, and, thus, without more information, it may not be possible to unambiguously resolve the target's surface position.

Moreover, in some cases when the CPR encoding scheme is used to encode an aircraft's surface position, a priori knowledge of whether the aircraft is located in the Northern or Southern hemispheres may be assumed. For reasons similar to those discussed above, for a statically positioned, terrestrial-based ADS-B receiver, this may not present a challenge, but for a space-based ADS-B receiver it may introduce additional ambiguity. However, the CPR-encoded surface position may be resolvable to two different latitudes separated by 90° (or approximately 10,000 kilometers). Consequently, in implementations in which the coverage area of a space-based ADS-B receiver has a radius (or other dimension as appropriate) less than 10,000 km, it may be possible to identify the appropriate latitude for the target aircraft based on the known location of the space-based ADS-B receiver and its coverage area.

Figure 1:
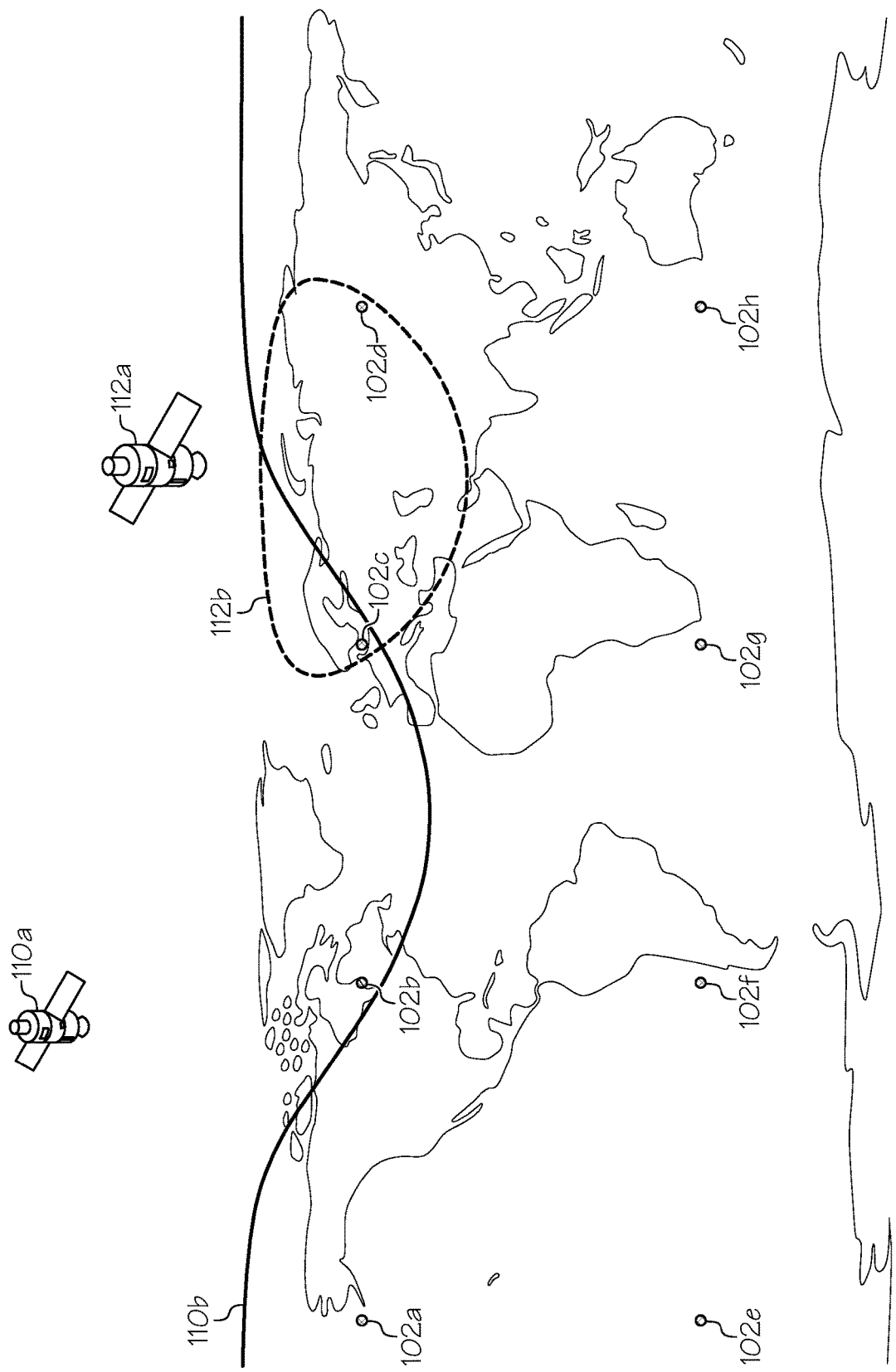
FIG. 1 is a diagram showing candidate locations for an aircraft based on encoded position information transmitted by the aircraft in accordance with a non-limiting implementation of the present disclosure.

FIG. 1 illustrates possible locations of an aircraft after a surface position decode operation and highlights examples of possible ambiguities that may result when the CPR encoding scheme is used in connection with a space-based ADS-B receiver. As illustrated in FIG. 1, the CPR-encoded surface position report has been decoded to yield eight different potential surface positions 102a-h of the aircraft, each in a different quadrant. In the case of a space-based ADS-B receiver that has a coverage area that includes two or more of these potential surface positions 102a-h, without more information, it may not be possible to determine which of the potential surface positions within the space-based ADS-B receiver's coverage area is the actual surface position of the aircraft.

As illustrated in FIG. 1, the ADS-B receiver on board satellite 110a has a coverage area circumscribed by curve 110b and the ADS-B receiver on board satellite 112a has a coverage area circumscribed by curve 112b such that the coverage area 110b of the ADS-B receiver on satellite 110a includes potential surface positions 102b and 102c and the coverage area of 112b of the ADS-B receiver on board satellite 112a includes potential surface positions 102c and 102b. Consequently, without more information, it may not be possible to unambiguously decode the surface position of the aircraft based on the CPR-encoded surface position report received by the ADS-B receiver on board satellite 110a alone. Similarly, without more information, it may not be possible to unambiguously decode the surface position of the aircraft based on the CPR-encoded surface position report received by the ADS-B receiver on satellite 112a alone.

The teachings of the present disclosure describe techniques for decoding surface position messages in space-based ADS-B systems. In particular implementations, a series of processes are applied during the decoding phase to identify the surface position of a target aircraft from a plurality of potential surface positions based on the encoded surface position message. The approaches described below may be implemented in a series of successive processes that reduce the number of possible surface positions down to just one.

In some cases, a space-based ADS-B receiver may have a coverage area that covers only one of the potential surface positions. In those cases, the actual surface position of the target may be identified with reference to the known coverage area of the receiving satellite alone. In other cases, a space-based ADS-B receiver may have a coverage area that covers two or more of the potential surface positions, such as, for example, as illustrated in FIG. 1 in connection with the coverage area 110b of the ADS-B receiver on board satellite 110a or the coverage area 112b of the ADS-B receiver on board satellite 112a. However, as described herein, in some such cases, additional information may be used to successfully identify the actual surface position of the target aircraft. For instance, in some cases, such as, for example, as illustrated in FIG. 1 in connection with the coverage areas 110b and 112b of the ADS-B receivers on board satellites 110a and 112a, respectively, the coverage areas of two or more space-based ADS-B receivers may overlap such that the space-based ADS-B receivers receive the same ADS-B message from the aircraft. In such cases, it may be possible to successfully identify the actual surface position of the aircraft based on the known overlap of the ADS-B receivers' coverage areas. For example, referring again to FIG. 1, the coverage areas 110b and 112b of the ADS-B receivers on board satellites 110a and 110b, respectively, overlap such that they both include potential surface position 102c and none of the other potential surface positions. Consequently, if both the ADS-B receiver on board satellite 110a and the ADS-B receiver on board satellite 112a receive the ADS-B surface position report, it may be possible to determine that potential surface position 102c is the actual surface position of the aircraft because it is the only potential surface position within the coverage areas 110b and 112b of both the ADS-B receiver on board satellite 110a and the ADS-B receiver on board satellite 112a. However, this represents just one example of a technique for successfully identifying the actual surface position of a target aircraft in a space-based ADS-B system. Additional or alternative techniques are described below.

Certain example processes and techniques for decoding CPR-encoded surface position reports in a space-based ADS-B system described below address certain limitations of the approach for decoding CPR-encoded surface position reports specified in the Minimum Operational Performance Standards (MOPS) for 1090 MHz Extended Squitter Automatic Dependent Surveillance—Broadcast (ADS-B) and Traffic Information Services—Broadcast (TIS-B) (the "DO-260B Supplement"), which specifies approaches for decoding CPR-encoded surface position reports in a terrestrial system. The example process and techniques may incorporate certain aspects of the decoding approaches specified in DO-260B Supplement, but they modify, supplement, and extend such approaches in a number of ways that yield improvements that address the aforementioned limitations. Those of ordinary skill in the art will appreciate that the techniques described in reference to each process may be implemented in any of a variety of different manners to suit any specific context for space-based ADS-B receivers and may not be limited to the specific implementations described herein.

In particular implementations, the first step in decoding a CPR-encoded surface position report is to decode the encoded latitude component of the surface position report for the target transmitter. As described above, decoding the encoded latitude component may yield two different potential latitude solutions separated by 90° (or approximately 10,000 km). In implementations which a space-based ADS-B receiver has a radius (or other dimension as appropriate) less than 10,000 km, it may be possible to identify the actual latitude of the target aircraft based on the known position of the space-based ADS-B receiver and/or its coverage footprint (e.g., by choosing the decoded latitude solution that is closest to the space-based ADS-B receiver's sub-satellite point (i.e., a point projected on the Earth's surface directly below the space-based ADS-B receiver and/or the satellite on which the space-based ADS-B receiver is hosted)).

FIG. 2 illustrates a process for decoding the latitude component of a target aircraft in a CPR-encoded surface position report received by a space-based ADS-B system. CPR-encoded surface position reports typically are transmitted as a pair of messages (an even and an odd message). In FIG. 2, the latitude component of an even CPR-encoded surface position message is designated as $YZ_0$; the latitude component of an odd CPR-encoded surface position report is designated as $YZ_1$; the latitude of the sub-satellite point is designated as $\phi$; and the most recent message parity identifier is designated as i (with i being 0 if the most recent message was even and 1 if the most recent message was odd). The process illustrated in FIG. 2 decodes and solves for the latitude component of the CPR-encoded surface position report of the target aircraft, which is designated as Rlat.

Lines 6-7 of FIG. 2 reference a process for determining a number of longitude zones based on an input value (designated as "lat" in FIG. 3). An example of such a process for determining the number of longitude zones is illustrated FIG. 3, and may return values between 1 and 59. As illustrated in FIG. 2, values of two different number of longitude zones, $NL_0$ and $NL_1$, corresponding to even and odd messages, respectively, are determined according to the process illustrated in FIG. 3 based on two separate input values $Rlat_0$ and $Rlat_1$, corresponding to even and odd messages, respectively, the values of which are calculated as illustrated in lines 1-5 of FIG. 2. If the number of longitude zones determined for the even and odd messages are not equal, a determination may be made that a failure has occurred and the effort to decode the specific pair of even and odd surface position messages may be abandoned.

Otherwise, as illustrated in lines 11-17 of FIG. 2, candidate latitude values $Rlat_{North}$ and $Rlat_{South}$, one in the Northern hemisphere and the other in the Southern hemisphere, are determined based on the previously determined values Rlat$_0$ and Rlat$_1$. Thereafter, as illustrated in lines 18-25, a particular one of the candidate latitude values as selected is the proper latitude value for the target aircraft and returned as Rlat.

Candidate longitude values then may be determined. For example, in particular implementations, the process illustrated in FIGS. 4A and 4B may be used to attempt to determine candidate longitude values and, if possible, an actual longitude value. In FIGS. 4A and 4B, the longitude component of an even CPR-encoded surface position message is designated as XZ$_0$; the longitude component of an odd CPR-encoded surface position message is designated as XZ$_1$; the previously determined latitude for the target aircraft (e.g., calculated according to the process illustrated in, and described in connection with, FIG. 2), is designated as Rlat; the sub-satellite points for each space-based ADS-B receiver in the space-based ADS-B system that received the pair of CPR-encoded surface position messages are designated as $[\phi_j, \lambda_j, h_j]$ (where $\phi_j$ represents latitude, $\lambda_j$ represents longitude, and $h_j$ represents altitude), where the index j indicates the corresponding space-based ADS-B receiver; the most recent message parity identifier is designated as i (with i being 0 if the most recent message was even and 1 if the most recent message was odd); and a definable constant that may be used to vary the maximum radius of the coverage area of individual space-based ADS-B receivers is designated as $\sigma_d$. (In some particular implementations, the value of $\sigma_d$ may be set to 1.2). As described in greater detail below, the process illustrated in FIGS. 4A and 4B attempts to resolve the longitude component of a CPR-encoded surface position report to a single longitude value, designated as Rlon.

Referring specifically to the example illustrated in FIG. 4A, in lines 1-10, a pool of four candidate longitude values are determined based on the previously determined latitude Rlat (e.g., according to the process illustrated in FIG. 2), a number of longitude zones NL determined as a function of the previously determined latitude Rlat (e.g., determined according to the process illustrated in FIG. 3), and the longitude components of the even and odd surface position messages. The four candidate longitude values then are stored in an array Rlon.

Thereafter, attempts are made to select one of the candidate longitude values from the pool as the actual longitude of the target aircraft. In particular, as illustrated in lines 11-19 of FIG. 4A, the candidate longitude values are tested with respect to each of the space-based ADS-B receivers that received the corresponding pair of surface position report messages to determine which, if any, of the candidate longitude values are located within the coverage area of each satellite that received the corresponding pair of surface position report messages. Specifically, as illustrated in line 12, a maximum radius of the coverage area of one of the space-based ADS-B receivers that received the corresponding pair of surface position report messages is determined and converted to an arc length along the Earth's surface $D_{max}$. (In line 12 of FIG. 4A, $R_\oplus$ represents a value for the radius of the Earth.) Thereafter, as illustrated in FIG. 4A, lines 13-18, the candidate longitude values are paired with the previously determined latitude for the target aircraft Rlat to create a pool of candidate latitude-longitude pair values (Rlat, Rlon$_k$), and the great-circle distance D between the sub-satellite point for the space-based ADS-B receiver ($\phi_j$, $\lambda_j$) and each candidate latitude-longitude pair (Rlat, Rlon$_k$) is determined and compared to the previously determined arc length along the Earth's surface $D_{max}$ corresponding to the maximum radius of the coverage area of the ADS-B receiver. If the great-circle distance D between the sub-satellite point for the space-based ADS-B receiver ($\phi_j$, $\lambda_j$) and a particular candidate latitude-longitude pair (Rlat, Rlon$_k$) exceeds the previously determined arc length along the Earth's surface $D_{max}$ corresponding to the maximum radius of the coverage area of the ADS-B receiver, a determination is made that the candidate latitude-longitude pair (Rlat, Rlon$_k$) is not within the coverage area of the ADS-B receiver, and the corresponding candidate longitude value is removed from the array of candidate longitude values. As illustrated in FIG. 4A, lines 11-19, this process may be repeated for all of the space-based ADS-B receivers that received the corresponding pair of surface position messages with any remaining candidate longitude value, for example, until all of the candidate longitude values have been removed or the tests have been completed for all of the space-based ADS-B receivers that received the corresponding pair of surface position messages.

Thereafter, as illustrated in FIG. 4A, lines 20-21, if no candidate longitude values remain, a determination is made that an error has occurred and the attempt to determine a surface position for the target aircraft based on the particular pair of surface position messages may be abandoned. Alternatively, if only a single candidate longitude value remains, it may be selected as the actual longitude of the target aircraft and returned as Rlon, whereas if multiple candidate longitude values remain, additional steps may be performed in an effort to resolve the remaining candidate longitude values to a single longitude value.

Specifically, as illustrated in FIG. 4B, lines 24-37, a determination is made as to whether any candidate longitude values were stored in connection with prior attempts to determine a surface position for the target aircraft (e.g., in connection with the most recent prior pair of surface position messages for the target aircraft). If not, as illustrated in FIG. 4B, lines 33-34, a determination is made that a longitude for the target aircraft cannot be determined based on the particular pair of surface position messages, but the remaining candidate longitude values are stored in an array Rlon$_{prev}$ for use in attempting to decode one or more subsequent pairs of surface position messages for the target aircraft.

Alternatively, if candidate longitude values were stored in connection with a prior attempt to determine a surface position for the target aircraft, as illustrated in FIG. 4B, line 26, the current remaining candidate longitude values are compared to the prior candidate longitude values, and any current remaining candidate longitude value that is within a predefined distance (e.g., 1° longitude) of a prior candidate longitude value may be retained as a current candidate longitude value and stored in an array Rlon$_{match}$. As illustrated in FIG. 4B, lines 27-28, if only one candidate longitude value is identified as being within the predefined distance of a prior candidate longitude value and retained as a candidate longitude value, that candidate longitude value may be identified as the actual longitude of the target aircraft. Alternatively, as illustrated in FIG. 4B, lines 29-31, if more than one candidate longitude value is identified as being within the predefined distance of a prior candidate longitude value, a determination that a longitude for the target aircraft cannot be determined based on the particular pair of surface position messages, but the remaining candidate longitude values are stored in an array Rlon$_{prev}$ for use in attempting to decode one or more subsequent pairs of surface position messages for the target aircraft.

Figure 5:
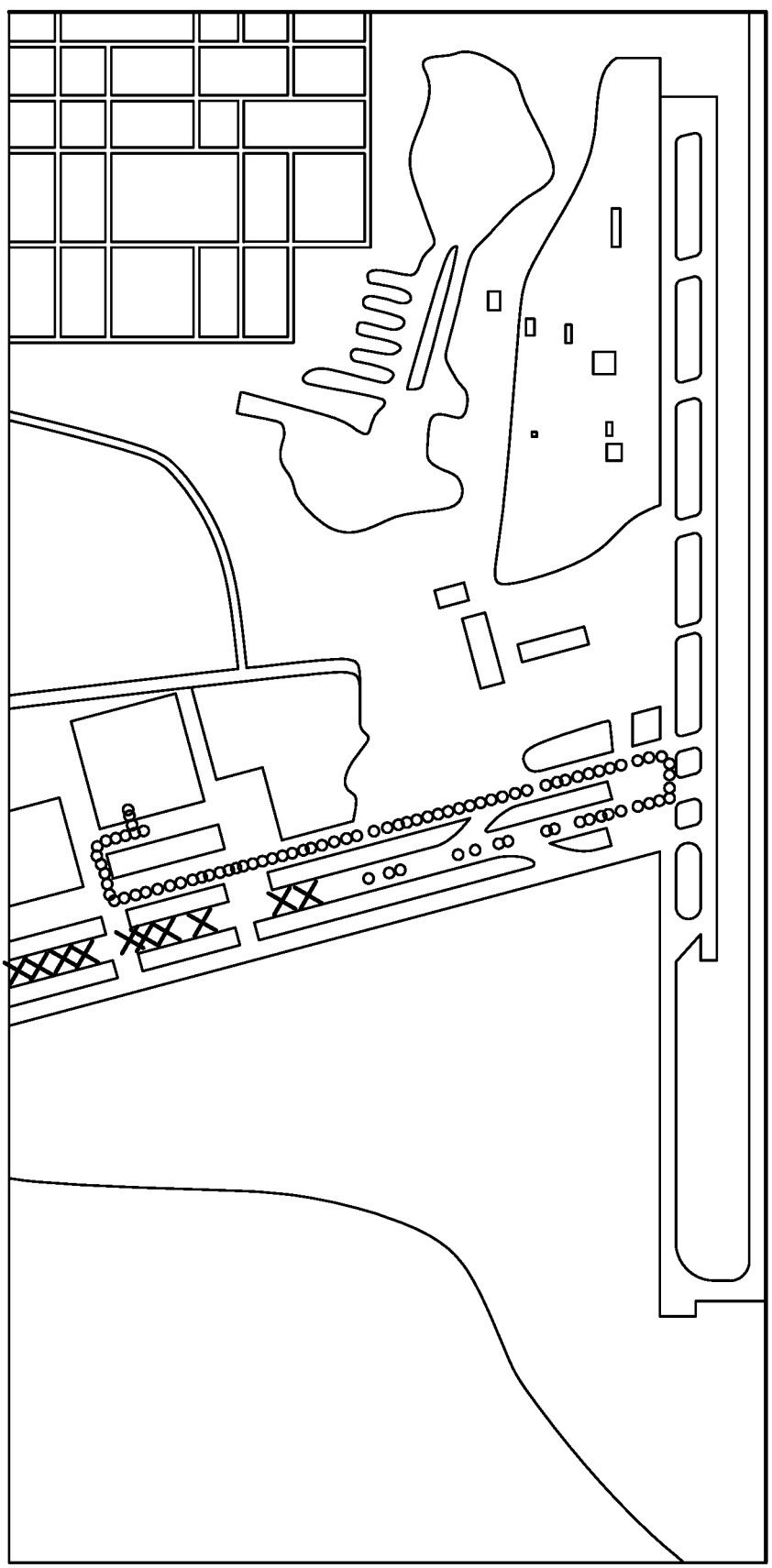
FIG. 5 is a diagram showing decoded position information for an aircraft according to a non-limiting implementation of the present disclosure.

In particular implementations, the various different processing steps for decoding the latitude and longitude components of a CPR-encoded surface position report described in connection with FIGS. 2, 3, and 4A and B can be performed in a variety of different orders. In some implementations, the processing steps may be performed by or in conjunction with a computing apparatus such as, for example, computing apparatus of ground segment 604 of FIG. 6A, computing apparatus of satellite communication network earth terminal 30 and/or air traffic management system 40 of FIG. 7, and/or computing apparatus on board a satellite. After latitude and longitude values have been successfully decoded from an aircraft's CPR-encoded surface position report, for example, according to the techniques described herein, the decoded surface position for the aircraft may be transmitted to one or more appropriate destinations (e.g., subscribing systems that subscribe to position reports or other information for the aircraft), such as, for example, an ANSP or other air traffic control authority, the airline to which the aircraft that transmitted the surface position report belongs, or any other entity or system that has an interest in the aircraft. For instance, they may be used to track the aircraft's ground position and movement (e.g., on a terminal or display for an air traffic controller). In one example, as illustrated in FIG. 5, successfully decoded surface positions for an aircraft can be used to track and control an aircraft's ground movement. In particular, FIG. 5 illustrates how successfully decoded surface positions for an aircraft (illustrated in FIG. 5 using small circles) can be used to track (and control) the ground position of an aircraft while it taxis from an airport concourse to the runway for takeoff (Successfully decoded airborne positions for the aircraft are illustrated in FIG. 5 using small x marks.)

Examples of ADS-B-Based Systems

The techniques for decoding position information in CPR-encoded position reports described herein can be implemented in a variety of different ADS-B-based systems, particular space-based ADS-B systems. Accordingly, to provide better context for and understanding of the decoding techniques, various examples of such ADS-B systems in which the techniques may be implemented are described below. In a typical ADS-B-based system, an aircraft determines its position using a satellite-based navigation system (e.g., the Global Positioning System ("GPS")) and, as described above, periodically broadcasts its position, thereby enabling the aircraft to be tracked by systems that receive the aircraft's ADS-B broadcasts. In some particular implementations, an ADS-B equipped aircraft uses onboard equipment and sensors to determine its horizontal position, altitude, and velocity and then combines this information with its aircraft identification and call sign into the ADS-B messages that it transmits.

ADS-B-based transponders, which may operate on the same frequency as traditional Mode A/C/S transponders (e.g., 1090 MHz), may utilize different data links and formats for broadcasting ADS-B messages, including, for example, DO-260, DO-260A and DO-260B (Link Versions 0, 1 and 2, respectively) and DO-260B/ED-102A. 1090 MHz Mode S ES is a particular example of one such data link that has been adopted in many jurisdictions. For example, in the United States, the Federal Aviation Administration ("FAA") has mandated 1090 MHz Mode S ES for use by air carrier and private or commercial operators of high-performance aircraft. Like traditional radar-based systems, ADS-B-based systems require appropriate infrastructure for receiving ADS-B messages broadcast by aircraft. As a result, even as numerous jurisdictions transition to terrestrial, ADS-B-based systems, air traffic in vast airspaces remains unmonitored where such infrastructure does not exist.

As described in this disclosure, to address this limitation of terrestrial ADS-B systems (or to supplement terrestrial ADS-B systems), ADS-B receivers may be hosted on satellites and used to receive ADS-B messages broadcast by aircraft. Such ABS-B messages received by the satellites then can be relayed back down to earth terminals or other terrestrial communications infrastructure for transmission to and use by air traffic control, aircraft surveillance, and flight path management services.

For example, as illustrated in FIG. 6A, a space-based ADS-B system 600 includes one or more satellites 602 in orbit above the Earth and a ground segment 604. Each satellite 602 is equipped with one or more receivers 606 configured to receive ADS-B messages transmitted by aircraft, including, but not limited to, airplanes 608 and helicopters 610, and the ground segment 604, among other things, is configured to communicate with the one or more satellites, including, for example, to receive ADS-B messages that the satellites 602 receive from the aircraft and then relay to the ground segment 604. As illustrated in FIG. 6A, ADS-B messages transmitted by aircraft may be received by terrestrial ADS-B infrastructure, if within range of the aircraft and not obstructed (e.g., by a topographical feature like a mountain or a man-made structure), and/or by ADS-B receivers 606 on board one or more of the satellites 602.

When an ADS-B message transmitted by an aircraft is received by an ADS-B receiver on a satellite 602, the satellite 602 may retransmit the received ADS-B message to the space-based ADS-B system's ground segment 604, for example via a ground station, earth station, earth terminal, teleport, and/or similar terrestrial component configured to communicate with the satellite(s) 602. From there, the space-based ADS-B system's ground segment may route (e.g., via one or more terrestrial communications networks) the ADS-B message (or some or all of the information contained therein) to one or more appropriate destinations 612, such as, for example, an air navigation service provider or other air traffic control authority, the airline to which the aircraft that transmitted the ADS-B message belongs, or any other entity with an interest in the ADS-B message. In some implementations, the information included in the ADS-B message may be combined with ground-based surveillance data and/or flight plan information for integration within air traffic control systems to provide air traffic controllers a single representation of a given aircraft. The space-based ADS-B system's ground segment 604 may transmit the information included in a received ADS-B message to a destination in one of a variety of different formats, including, for example, ASTERIX CAT021, CAT023, CAT025, CAT238 and FAA CAT033 and CAT023.

In some implementations, individual satellites 602 within the space-based ADS-B system 600 may retransmit ADS-B messages that they receive directly to the ground segment 604. Additionally, or alternatively, and as illustrated in FIG. 6A, in some implementations, communications crosslinks 614 may be established between two or more satellites 602 within the space-based ADS-B system 600, thereby enabling the satellites 602 to communicate with one another. In such implementations, a satellite 602 that receives an ADS-B message may retransmit the ADS-B message to the ground segment 604 indirectly through one or more additional satellites 602 within the space-based ADS-B system 600 via the communications crosslinks 614.

Notably, as illustrated in FIG. 6A, ADS-B messages transmitted by aircraft flying over regions where terrestrial ADS-B infrastructure does not exist, for example over oceans 616 or rugged or remote terrain like the poles or mountain ranges 618, may be received by ADS-B receivers 614 on board one or more of the satellites 602. As a result, tracking, monitoring, and/or surveilling aircraft flying over these regions still may be possible even in the absence of terrestrial ADS-B infrastructure in these regions. Space-based ADS-B systems may provide a number of additional advantages as well. For example, traditional radar-based air traffic control systems may be limited in their ability to service high-traffic environments, such as, for example, at or near airports. In contrast, space-based ADS-B systems may provide better service at or near airports and in high traffic areas, thereby enabling, for example, more efficient ground control and flight takeoff and landing schedules and more flexible aircraft maneuvers in congested environments. Additionally, or alternatively, a space-based ADS-B system that provides global ADS-B coverage may enable an airline to have up-to-date and real-time or near real-time visibility of its entire fleet of aircraft at any given moment.

FIG. 6B is a high-level block diagram that provides another illustration of an example of a space-based ADS-B system 5. As illustrated in FIG. 6B, system 5 includes satellite 10 in communication with and part of satellite network 20, and aircraft 70. In some implementations, satellite network 20, including satellite 10, may be a low-Earth orbit ("LEO") constellation of cross-linked communications satellites. As illustrated in FIG. 6B, terrestrial ADS-B ground station 60, air traffic management system 40 and satellite communication network earth terminal 30 are located on Earth 80's surface.

Aircraft 70 carries an on-board ADS-B transponder 72 that broadcasts ADS-B messages containing flight status and tracking information. Satellite 10 carries payload 12 to receive ABS-B messages broadcast by aircraft 70 and other aircraft. In some implementations, multiple or all of the satellites in satellite network 20 may carry ADS-B payload to receive ADS-B messages broadcast by aircraft. Messages received at receiver 12 are relayed through satellite network 20 to satellite communication network Earth terminal 30 and ultimately to air traffic management system 40 through terrestrial network 50. The air traffic management system 40 may receive aircraft status information from various aircraft and provide additional services such as ground and/or air traffic control and scheduling or pass appropriate information along to other systems or entities.

In some implementations, ADS-B payload 12 may have one or more antennas and one or more receivers for receiving ADS-B messages broadcast by aircraft. Additionally, or alternatively, in some implementations, ADS-B payload 12 may have a phased array antenna formed from multiple antenna elements that collectively are configured to provide multiple different beams for receiving ADS-B messages.

Terrestrial ADS-B ground station 60 provides aircraft surveillance coverage for a relatively small portion of airspace, for example, limited to aircraft within line of sight of ground station 60. Even if terrestrial ADS-B ground stations like ground station 60 are widely dispersed across land regions, large swaths of airspace (e.g., over the oceans) will remain uncovered. Meanwhile, a spaced-based ADS-B system 5 utilizing a satellite network like satellite network 20 may provide coverage of airspace over both land and sea regions without being limited to areas where ground-based surveillance infrastructure has been installed. Thus, a space-based ADS-B system may be preferable (or a valuable supplement) to terrestrial approaches.

As described above, in some implementations, a space-based ADS-B system may include a constellation of multiple satellites equipped with one or more ADS-B receivers in low-Earth orbit ("LEO") (e.g., 99-1,200 miles above the Earth's surface). For example, as illustrated in FIG. 7, in one particular implementation, a space-based ADS-B system 200 may include 66 LEO satellites 202 equipped with one or more ADS-B receivers (not shown) arranged in 6 orbital planes 204 (e.g., in substantially polar orbits) of 11 satellites each. In this arrangement, the satellites 202 collectively may provide global (or substantially global) ADS-B coverage. For example, the individual satellites 202 of the constellation may have ADS-B coverage footprints that collectively are capable of covering every square inch (or nearly every square inch) of the Earth's surface. As further illustrated in FIG. 7 and as also discussed above in connection with FIGS. 6A and 6B, in some implementations, communications cross-links may be established between individual satellites 202, thereby effectively forming a wireless mesh network in space that may enable the satellites 202 to communicate with each other and to relay ADS-B messages received by individual satellites 202 through the network. In the particular implementation illustrated in FIG. 7, each satellite is cross-linked to four satellites 202: one satellite 202 in each of the fore and aft direction of its orbital 204 plane and one satellite 202 in each of the adjacent orbital planes 204 to the left and right. Although the specific implementation illustrated in FIG. 7 is shown as including 66 LEO satellites 202 arranged in 6 orbital planes 204 (e.g., in substantially polar orbits) of 11 satellites 202 each, space-based ADS-B systems may include different numbers of satellites 202 (e.g., more or less than 66), arranged in different plane configurations (e.g., in different numbers of planes and/or in planes having different inclinations), and in different orbits (e.g., mid-Earth orbit ("MEO"), geostationary orbit ("GEO"), geosynchronous, and/or sun synchronous).

The techniques for decoding position information described herein have been described generally in the context of decoding position information for aircraft. However, they can be applied more generally to decode position information for any type of vehicle or transponder that transmits such position information.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more machine-readable media having machine-readable program code embodied thereon.

Any combination of one or more machine-readable media may be utilized. The machine-readable media may be a machine-readable signal medium or a machine-readable storage medium. A machine-readable storage medium may be, for example, but not limited to, an electronic, magnetic, optical, electromagnetic, or semiconductor system, apparatus, or device, or any suitable combination of the foregoing. More specific examples (a non-exhaustive list) of such a machine-readable storage medium include the following: a hard disk, a random access memory (RAM), a read-only memory (ROM), an erasable programmable read-only memory (EPROM or Flash memory), an appropriate optical fiber with a repeater, an optical storage device, a magnetic storage device, or any suitable combination of the foregoing. In the context of this document, a machine-readable storage medium may be any tangible medium that can contain or store a program for use by or in connection with an instruction execution system, apparatus, or device, such as, for example, a microprocessor.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. Program code embodied on a machine-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The figures illustrate examples of the architecture, functionality, and operation of possible implementations of systems, methods and computer program products according to various aspects of the present disclosure. In this regard, each step in a process or block in a diagram may represent a module, segment, or portion of code, which comprises one or more executable instructions for implementing the specified logical function(s). It should also be noted that, in some alternative implementations, the process steps may occur out of the order illustrated in the figures. For example, two process steps shown in succession may, in fact, be executed substantially concurrently, or the process steps may sometimes be executed in the reverse order, depending upon the functionality involved. It will also be noted that each process step or block of the block diagrams, and combinations of the process steps or blocks in the block diagrams, can be implemented by special purpose hardware-based systems that perform the specified functions or acts, or combinations of special purpose hardware and machine-readable instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method, comprising:
    receiving, from one or more space-based receivers, a pair of messages received by each of the one or more space-based receivers, the pair of messages comprising encoded position information of a transmitter of the pair of messages;
    determining a pool of a plurality of candidate locations for the transmitter based on the encoded position information;
    determining a location of the transmitter of the message by eliminating particular candidate locations from the pool until only one candidate location remains, wherein the determining comprises:
        eliminating each candidate location from the pool that is not within a coverage area of each of the one or more space-based receivers;
        eliminating each candidate location from the pool that is not within a predetermined distance of at least one previous candidate location from a previous candidate location pool;
        determining that the remaining candidate location is within the coverage area of each of the one or more space-based receivers; and
        determining that the remaining candidate location is within the predetermined distance of at least one previous candidate location from the previous candidate location pool; and
    transmitting the determined location of the transmitter to a subscriber system that subscribes to position reports for the transmitter.

2. The method of claim 1, wherein the eliminating each candidate location from the pool that is not within a coverage area of each of the one or more space-based receivers comprises:
    for each of the one or more space-based receivers and for each candidate location in the pool, determining whether the corresponding coverage area for the space-based receiver includes the candidate location.

3. The method of claim 1, wherein an encoding applied to the encoded position information abstracts the position information relative to a plurality of regions such that the encoded position information corresponds to a position in each region.

4. The method of claim 3, wherein the encoding is based on a compact position reporting ("CPR") encoding scheme.

5. The method of claim 1, wherein the previous candidate location pool comprises a plurality of previous candidate locations corresponding to a previous pair of messages.

6. The method of claim 5, wherein the previous pair of messages comprises different encoded position information of the transmitter of the previous message.

7. The method of claim 1, wherein determining a pool of a plurality of candidate locations for the transmitter based on the encoded position information includes determining a latitude for the transmitter and four candidate longitudes for the transmitter.

8. The method of claim 1, wherein each of the one or more space-based receivers are hosted on a respective satellite in low-Earth orbit.

9. The method of claim 8, wherein the transmitter is hosted on an aircraft.

10. The method of claim 9, wherein the pair of messages are automatic dependent surveillance-broadcast ("ADS-B") messages transmitted from the aircraft.

11. The method of claim 10, wherein the pair of ADS-B messages are surface position messages indicating a ground position of the aircraft when grounded.

12. The method of claim 8, wherein eliminating each candidate location from the pool that is not within a coverage area of each of the one or more space-based receivers includes:
  determining the coverage area of each of the one or more space-based receivers for a time period for the pair of messages based on known locations of each respective satellite during the time period.

13. A method, comprising:
  receiving, from each of a plurality of satellite-based receivers, a pair of messages received by each of the plurality of satellite-based receivers, the pair of messages comprising encoded position information of a transmitter of the pair of messages;
  decoding the encoded position information;
  determining a pool of a plurality of candidate locations for the transmitter based on the decoded position information; and
  for each of the plurality of satellite-based receivers:
    determining whether each candidate location in the pool is within a coverage area for the satellite-based receiver; and
    if any candidate location in the pool is not within the coverage area for the satellite-based receiver, removing that candidate location from the pool.

14. The method of claim 13, further comprising:
  determining whether any previous candidate locations are stored for the transmitter; and
  based on determining that no previous candidate locations are stored, storing remaining candidate locations not removed from the pool as previous candidate locations.

15. The method of claim 14, further comprising:
  determining that only one remaining candidate location has not been removed from the pool; and
  based on determining that only one remaining candidate location has not been removed from the pool, transmitting the remaining candidate location to a third party system.

16. The method of claim 13, wherein each satellite-based receiver is hosted on a satellite in low-Earth orbit.

17. The method of claim 13, wherein:
  the transmitter is hosted on an aircraft and transmits automatic dependent surveillance-broadcast ("ADS-B") messages; and
  the pair of messages are ADS-B messages transmitted by the transmitter.

18. The method of claim 13, wherein determining whether each candidate location in the pool is within a coverage area for the satellite-based receiver includes determining a coverage area for the satellite-based receiver based on a known location of a satellite on which the satellite-based receiver resides.

19. A terrestrial processing center that tracks aircraft positioning using a multi-satellite, satellite constellation, the terrestrial control center comprising:
  one or more processing elements; and
  a non-transitory, computer-readable storage medium storing computer-readable instructions that, when executed by the one or more processing elements, cause the terrestrial control center to:
    process pairs of compact position reporting ("CPR") encoded, automatic dependent surveillance-broadcast ("ADS-B") surface position messages received from each of one or more space-based receivers, the pairs of messages comprising encoded surface position information of a transmitter of the pair of messages and having been received by each of the one or more space-based receivers;
    determine a latitude component of a location of the transmitter based on the encoded surface position information;
    determine a pool of a plurality of candidate longitude values for the location of the transmitter based on the encoded surface position information;
    select a longitude component of the location of the transmitter of the message from the pool, wherein the selecting comprises:
      eliminating each candidate longitude value from the pool that is not within a coverage area of each of the one or more space-based receivers;
      eliminating each candidate longitude value from the pool that is not within a predetermined distance of at least one previous candidate longitude location from a previous pool of candidate longitude values;
      determining that a remaining candidate longitude value is within the coverage area of each of the one or more space-based receivers;
      determining that the remaining candidate longitude value is within the predetermined distance of at least one previous candidate longitude location from the previous pool of candidate longitude values; and
      selecting the remaining candidate longitude value based on determining that the remaining candidate longitude value is within the coverage area of each of the one or more space-based receivers and within the predetermined distance of the at least one previous candidate longitude location;
    determine the location of the transmitter based on the determined latitude component and selected longitude component; and
    transmit the determined location of the transmitter to an external system.

20. The terrestrial processing center of claim 19, wherein the computer-readable storage medium further stores computer-readable instructions that, when executed by the one or more processing elements, cause the terrestrial processing center to initialize the pool of the plurality of candidate longitude values to include four candidate longitude values based on the encoded surface position information, wherein each candidate longitude component in the pool is separated by 90°.

* * * * *